(12) United States Patent
Han et al.

(10) Patent No.: US 12,495,429 B2
(45) Date of Patent: Dec. 9, 2025

(54) METHOD AND APPARATUS FOR MULTIPLEXING MAC CES

(71) Applicant: LENOVO (BEIJING) LIMITED, Beijing (CN)

(72) Inventors: Jing Han, Beijing (CN); Min Xu, Beijing (CN); Ran Yue, Beijing (CN); Lianhai Wu, Beijing (CN); Haiming Wang, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 383 days.

(21) Appl. No.: 18/040,829

(22) PCT Filed: Aug. 7, 2020

(86) PCT No.: PCT/CN2020/107795
§ 371 (c)(1),
(2) Date: Feb. 7, 2023

(87) PCT Pub. No.: WO2022/027581
PCT Pub. Date: Feb. 10, 2022

(65) Prior Publication Data
US 2023/0292334 A1    Sep. 14, 2023

(51) Int. Cl.
*H04W 72/231* (2023.01)
*H04L 1/1829* (2023.01)
(Continued)

(52) U.S. Cl.
CPC ......... *H04W 72/231* (2023.01); *H04L 1/1854* (2013.01); *H04W 24/10* (2013.01); *H04W 72/535* (2023.01)

(58) Field of Classification Search
CPC . H04W 72/231; H04W 72/535; H04W 24/10; H04L 1/1854; H04L 1/1825
See application file for complete search history.

(56) References Cited

U.S. PATENT DOCUMENTS

| | | | |
|---|---|---|---|
| 2014/0153531 A1* | 6/2014 | Ko | H04L 1/1819 370/329 |
| 2018/0324862 A1* | 11/2018 | Mallick | H04W 72/23 |
| 2021/0219329 A1* | 7/2021 | Zhou | H04L 1/1819 |

FOREIGN PATENT DOCUMENTS

| | | |
|---|---|---|
| CN | 104468060 A | 3/2015 |
| CN | 104579602 A | 4/2015 |

OTHER PUBLICATIONS

Patent Cooperation Treaty (PCT) International Application No. PCT/CN/2020/107795, International Search Report and Written Opinion, Apr. 25, 2021.
(Continued)

*Primary Examiner* — Jamal Javaid
(74) *Attorney, Agent, or Firm* — Isidore PLLC

(57) ABSTRACT

The present application relates to a method and an apparatus for multiplexing MAC CEs. One embodiment of the subject application provides a method including: receiving an uplink grant associated with a first retransmission scheme; selecting one or more first media access control (MAC) control elements (CEs) from a first number of MAC CEs according to the first retransmission scheme, wherein the one or more first MAC CEs are associated with the first retransmission scheme; and multiplexing the one or more first MAC CEs to a MAC protocol data unit (PDU) associated with an uplink grant.

20 Claims, 3 Drawing Sheets

(51) Int. Cl.
   *H04W 24/10*   (2009.01)
   *H04W 72/50*   (2023.01)

(56) References Cited

OTHER PUBLICATIONS

3GPP Draft; R2-1905796, May 13, 2019, 3rd Generation Partnership Project (3GPP), Mobile Competence Centre, 650, route des Lucioles, F-06921 Sophia-Antipolis Cedex, France.
3GPP Draft; R2-2002710, Apr. 9, 2020, 3rd Generation Partnership Project (3GPP), Mobile Competence Centre, 650, route des Lucioles, F-06921 Sophia-Antipolis Cedex, France.

* cited by examiner

METHOD AND APPARATUS FOR MULTIPLEXING MAC CES

TECHNICAL FIELD

The subject application relates to wireless communication technology, and more particularly, related to a method and an apparatus for multiplexing media access control (MAC) control elements (CEs).

BACKGROUND OF THE INVENTION

Hybrid automatic repeat request (HARQ) feedback may be enabled or disabled per user equipment (UE) or per HARQ process. In other words, the feedback for some HARQ processes or for some UEs may be enabled, while the feedback for others may be disabled.

There are different types of MAC CEs, some MAC CEs require high reliability, thus HARQ feedback is necessary, while some MAC CEs require low latency, thus HARQ feedback is unnecessary. Therefore, it is desirable to provide a solution for multiplexing MAC CEs into the MAC protocol data unit (PDU) associated with a suitable uplink grant, so as to meet these different requirements.

SUMMARY

One embodiment of the subject application provides a method including: receiving an uplink grant associated with a first retransmission scheme; selecting one or more first media access control (MAC) control elements (CEs) from a first number of MAC CEs according to the first retransmission scheme, wherein the one or more first MAC CEs are associated with the first retransmission scheme; and multiplexing the one or more first MAC CEs to a MAC protocol data unit (PDU) associated with an uplink grant.

Yet another embodiment of the subject application provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method including: receiving an uplink grant associated with a first retransmission scheme; selecting one or more first media access control (MAC) control elements (CEs) from a first number of MAC CEs according to the first retransmission scheme, wherein the one or more first MAC CEs are associated with the first retransmission scheme; and multiplexing the one or more first MAC CEs to a MAC protocol data unit (PDU) associated with an uplink grant.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Figure 1:
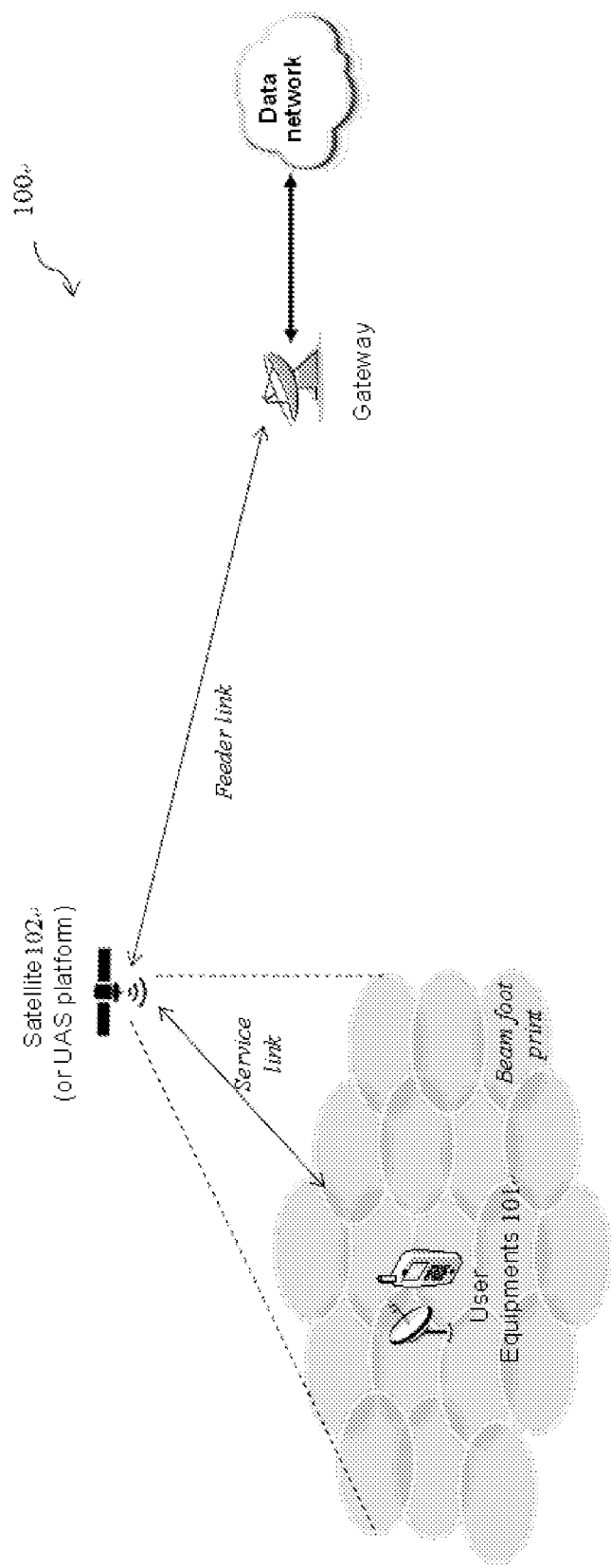
FIG. 1 illustrates an exemplary non-terrestrial network (NTN) network in which techniques disclosed herein may be implemented, in accordance with some embodiments of the present disclosure.

FIG. 1 illustrates an exemplary NTN network in which techniques disclosed herein may be implemented, in accordance with some embodiments of the present disclosure.

As shown in FIG. 1, the NTN network 100 includes at least one user equipment (UE) 101 and at least one satellite BS 102, or alternatively a UAS platform 102. Although only one UE 101 and a satellite/UAS platform 102 are depicted in FIG. 1, it is contemplated that any number of UEs 101 and satellites/UAS platforms 102 may be included in the wireless communication system 100.

The UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 101 includes wearable devices, such as smart watches, fitness bands, optical head-mounted displays, or the like. Moreover, the UE 101 may be referred to as subscriber units, mobiles, mobile stations, users, terminals, mobile terminals, wireless terminals, fixed terminals, subscriber stations, user terminals, a device, or by other terminology used in the art. The UE 101 may communicate directly with the satellite BS 102 via service link.

Satellite(s) BS 102 may include Low Earth Orbiting (LEO) satellites, Medium Earth Orbiting (MEO) satellites, Geostationary Earth Orbiting (GEO) satellites, as well as Highly Elliptical Orbiting (HEO) satellites. UAS platform(s) 102 may include Unmanned Aircraft Systems (UAS) including tethered UAS and Lighter than Air UAS (LTA), Heavier than Air UAS (HTA), and High Altitude Platforms UAS (HAPs). For convenience, we will use satellite 102 hereinafter to elaborate the present disclosure. However, persons skilled in the art can know that the same technique may also be applied to UAS platform(s).

Referring still to FIG. 1, the satellite 102 provides a plurality of geographic cells for serving UEs 101 located in one or more of the geographic cells. In FIG. 1, example UEs may be a normal mobile terminal 101, which can wirelessly communicate with the satellite/UAS platform 102 via a communications link, such as service link or radio link in accordance with a NR access technology (e.g., a NR-Uu interface). As also shown in FIG. 1, the satellite 102 also communicates with a gateway or earth station via a communication link, which may be a feeder link or radio link in accordance with NR access technologies or other technologies. In accordance with various embodiments, the satellite 102 may be implemented with either a transparent or a regenerative payload. When the satellite carries a "transparent" payload, it performs only radio frequency filtering, frequency conversion and/or amplification of signals on board. Hence, the waveform signal repeated by the payload is un-changed. When a satellite carries a regenerative payload, in addition to performing radio frequency filtering, frequency conversion and amplification, it performs other signal processing functions such as demodulation/decoding, switching and/or routing, coding/decoding and modulation/demodulation on board as well. In other words, for a satellite with a regenerative payload (re, all or part of base station functions (e.g., a gNB, eNB, etc.) are implemented on board.

A typical terrestrial communication network includes one or more base stations (typically known as a "BS") that are located on earth (i.e., not airborne or spaceborne) that each provides geographical radio coverage, and UEs that can transmit and receive data within the radio coverage. In the terrestrial communication network, a BS and a UE can communicate with each other via a communication link, e.g., via a downlink radio frame from the BS to the UE or via an uplink radio frame from the UE to the BS.

Returning back to FIG. 1, the gateway may be coupled to a data network such as, for example, the Internet, terrestrial public switched telephone network, mobile telephone network, or a private server network, etc. Gateway and the satellite 102 communicate over a feeder link, which has both a feeder uplink from the gateway to the satellite 102 and a feeder downlink from the satellite 102 to the gateway. Although a single gateway is shown, some implementations will include many gateways, such as five, ten, or more. One embodiment includes only one gateway. UE 101 and satellite 102 communicate over service link, which has both an uplink from the UE 101 to the BS 102 and a downlink from the BS 102 to the UE 101.

In some embodiments, communication within the system of FIG. 1 follows a nominal roundtrip direction whereby data is received by gateway from data network (e.g., the Internet) and transmitted over a forward path to a set of UE 101. In one example, communication over the forward path comprises transmitting the data from gateway to satellite 102 via uplink of the feeder link, through a first signal path on satellite, and from satellite 102 to UE(s) 101 via downlink of the service link. Data can also be sent from the UEs 101 over a return path to gateway. In one example, communication over the return path comprises transmitting the data from a UE (e.g., UE101a) to satellite 102 via uplink of the service link, through a second signal path on satellite 102, and from satellite 102 to gateway via downlink of the feeder link.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3rd Generation Partnership Project (3GPP)-based network, 3GPP 5G network, a satellite communications network, a high altitude platform network, and/or other communications networks.

In one implementation, the wireless communication system 100 is compliant with the NR of the 3GPP protocol, wherein the BS 102 transmits using an orthogonal frequency division multiplexing (OFDM) modulation scheme on the DL and the UE 101 transmits on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the BS 102 may communicate using other communication protocols, such as the IEEE 802.11 family of wireless communication protocols. Further, in some embodiments the BS 102 may communicate over licensed spectrum, while in other embodiments the BS 102 may communicate over unlicensed spectrum. The present disclosure is not intended to be limited to the implementation of any particular wireless communication system architecture or protocol. In another embodiment, the BS 102 may communicate with the UE 101 using the 3GPP 5G protocols.

HARQ feedback can be enabled or disabled per UE or per HARQ process. In other words, UE A may be enabled with HARQ feedback, and UE B may be disabled with HARQ feedback. HARQ process 1 of UE A may be enabled with HARQ feedback, and HARQ process 2 of UE A may be disabled with HARQ feedback. The enabling and disabling of HARQ feedback are flexible.

The HARQ processes with feedback enabled are considered as having higher reliability compared with those HARQ processes with feedback disabled. On the other hand, HARQ processes with feedback disabled are considered as having lower delay than those HARQ processes with feedback enabled.

There are wireless communication systems having large round trip delay (RTD) between the BS and the UE. For example, as depicted in FIG. 1, when the function of the BS are implemented on board, the RTD may reach hundreds of milliseconds according to 3GPP documents. Therefore, in these systems, in order to maintain the Quality of Service (QoS) of these communication systems, it is necessary to guarantee the MAC CEs that require high reliability being multiplexed into the HARQ processes with feedback enabled, and the MAC CEs that require low latency being multiplexed into the HARQ processes with feedback disabled.

There are multiple MAC CEs for UL transmission, and different MAC CEs has different requirements. How to take all these different requirements into consideration, and how to multiplex the multiple MAC CEs into the MAC PDU associated with a suitable UL grant is the problem that need to be solved.

The present disclosure proposes to take the Logical Channel prioritization (LCP) restriction for different MAC CEs, and solve the above issues.

According to 3GPP documents, the logical channels shall be prioritized in accordance with the following table, the lower priority value, the higher priority level of the logical channel.

TABLE 1

| Priority value | Logical channels |
|---|---|
| 1. | C-RNTI MAC CE or data from UL-CCCH |
| 2. | i. Configured Grant Confirmation MAC CE<br>ii. BFR MAC CE<br>iii. Multiple Entry Configured Grant Confirmation MAC CE |
| 3. | Sidelink Configured Grant Confirmation MAC CE |
| 4. | LBT failure MAC CE |
| 5. | MAC CE for SL-BSR |
| 6. | MAC CE for BSR, with exception of BSR included for padding |
| 7. | i. Single Entry PHR MAC CE<br>ii. Multiple Entry PHR MAC CE |
| 8. | MAC CE for the number of Desired Guard Symbols |
| 9. | MAC CE for Pre-emptive BSR |
| 10. | MAC CE for SL-BSR, with exception of SL-BSR and SL-BSR included for padding |
| 11. | data from any Logical Channel, except data from UL-CCCH |
| 12. | MAC CE for Recommended bit rate query |

TABLE 1-continued

| Priority value | Logical channels |
|---|---|
| 13. | MAC CE for BSR included for padding |
| 14. | MAC CE for SL-BSR included for padding |

It should be noted that the prioritization between Configured Grant Confirmation MAC CE and BFR MAC CE is up to UE implementation.

The above MAC CEs have different contents, different usages, and different requirements. In order to better satisfy the QoS requirement of these MAC CEs, the present disclosure proposes to divide these MAC CEs into different groups according to different contents, different usages, and different requirements of the MAC CEs. Such classification may be specified in standardization or configured by network, e.g. using RRC signalling. Different UL MAC CEs may have different requirements according to its usage, and thus different retransmission schemes are proposed for these MAC CEs. One example of grouping the UL MAC CEs is presented as follows, MAC CEs may be divided into at least one of following five groups:

For the first group, some MAC CEs require high reliability, thus feedback-based retransmission is always used for these MAC CEs. The first group includes the following MAC CEs:
1. Configured Grant Confirmation MAC CE;
2. Multiple Entry Configured Grant Confirmation MAC CE;
3. Sidelink Configured Grant Confirmation MAC CE; and
4. MAC CE for the number of Desired Guard Symbols.

For the second group, some MAC CEs require low latency, thus non-feedback-based retransmission is always used for these MAC CEs, that is, the retransmission for these MAC CEs is disabled with feedback. The second group includes the following MAC CEs:
1. MAC CE for SL-BSR; and
2. MAC CE for SL-BSR, with exception of SL-BSR and SL-BSR included for padding.

For the third group, the retransmission scheme of these MAC CEs may be configured by the BS, or the network. The third group includes the following MAC CEs:
1. LBT failure MAC CE;
2. BFR MAC CE;
3. Single Entry PHR MAC CE;
4. Multiple Entry PHR MAC CE;
5. MAC CE for Pre-emptive BSR; and For the fourth group, the features of some MAC CEs are associated with corresponding logical channels (LCH), these MAC CEs may use the retransmission scheme according to the associated LCH. The fourth group includes:
1. MAC CE for BSR, with exception of BSR included for padding For the fifth group, these MAC CEs does not have requirement for the retransmission scheme, therefore, they can be multiplexed into a MAC PDU with any retransmission scheme. The fifth group includes the following MAC CEs:
1. C-RNTI MAC CE;
2. MAC CE for Recommended bit rate query;
3. MAC CE for BSR included for padding; and
4. MAC CE for SL-BSR included for padding.

When a UE receives an uplink grant from the BS, the uplink grant has the associated retransmission scheme. For example, the uplink grant may be associated with the feedback-based retransmission, or non-feedback-based retransmission. The non-feedback-based retransmission may include a blind uplink retransmission scheme; and a bundling uplink retransmission scheme, etc.

The UE then selects some MAC CEs, multiplexes them to a MAC PDU, and transmits the MAC PDU on the uplink grant. When the uplink grant is associated with the feedback-based retransmission, the UE may select the MAC CEs that requires HARQ feedback-based retransmission, or the MAC CEs that have no requirement for retransmission scheme. When the uplink grant is associated with the non-feedback-based retransmission, the UE may select the MAC CE that require HARQ non-feedback-based retransmission, or the MAC CEs that have no requirement for retransmission scheme.

More specifically, regarding the above MAC CE groups, one embodiment for multiplexing the MAC CEs is presented as follows:

When the UL grant is enabled with HARQ feedback, i.e. using feedback-based uplink retransmission scheme, the following MAC CEs may be multiplexed to the MAC PDU associated with the UL grant:
  a) The MAC CEs in the first group, the MAC CEs therein require feedback-based UL retransmission scheme;
  b) The MAC CEs in the third group, whether the MAC CEs in the third group require feedback-based UL retransmission scheme is configured by network, when they are configured to require feedback-based UL retransmission scheme, the MAC CEs in the third group can be selected.
  c) The MAC CEs in the fourth group, whether the MAC CEs in the fourth group require feedback-based UL retransmission scheme is based on the logical channels. When the associated logical channel is feedback enabled, the MAC CEs in the fourth group shall use feedback-based UL retransmission scheme. The logical channels that are feedback enabled may include, for example, LCH that triggered Buffer Status Report (BSR) is feedback enabled, and the highest priority LCH in BSR is feedback enabled, etc.
  d) The MAC CEs in the fifth group, since the MAC CEs in the fifth group do not have any requirement for retransmission scheme, i.e. there is no LCP restriction for these MAC CEs, thus the MAC CEs in the fifth group can be selected.

When UL grant is disabled with HARQ feedback, i.e. using non-feedback-based uplink retransmission scheme, the following MAC CEs the following MAC CE may be multiplexed to the MAC PDU associated with the UL grant:
  a) The MAC CEs in the second group, the MAC CEs therein always use non-feedback-based UL retransmission scheme;
  b) The MAC CEs in the third group, whether the MAC CEs in the third group require feedback-based UL retransmission scheme is configured by network, when they are configured to use non-feedback-based UL retransmission scheme, the MAC CEs in the third group can be selected.
  c) The MAC CEs in the fourth group, whether the MAC CEs in the fourth group require non-feedback-based UL retransmission scheme is based on the logical channels. When the associated logical channel is feedback disabled, the MAC CEs in the fourth group shall use non-feedback-based UL retransmission scheme. The logical channels that are feedback disabled may include, for example, LCH that triggered BSR is feedback disabled, and the highest priority LCH in BSR is feedback disabled, etc.

d) The MAC CEs in the fifth group, since the MAC CEs in the fifth group do not have any requirement for retransmission scheme, i.e. there is no LCP restriction for these MAC CEs, thus the MAC CEs in the fifth group can be selected.

It should be noted that the MAC CEs in the fifth group may be multiplexed to all MAC PDU.

In the above embodiments for multiplexing the MAC CEs, the MAC CEs are multiplexed according to the retransmission scheme used by the MAC CEs and the retransmission scheme of the uplink grant. When the retransmission scheme used by a MAC CE is aligned with the retransmission scheme of the uplink grant, such an uplink grant is a suitable uplink grant for the MAC CE, likewise, from the perspective of the uplink grant, these MAC CEs may be referred to as suitable MAC CEs for the uplink grant. When the retransmission scheme used by a MAC CE is not aligned with the retransmission scheme of the uplink grant, the uplink grant is considered as an unsuitable uplink grant for the MAC CE, and the MAC CE is considered as an unsuitable MAC CE for the uplink grant.

In some other embodiments, the MAC CEs may be multiplexed to the MAC PDU associated with an unsuitable UL grant.

For example, when there are still some padding bits left in an UL grant after assembling the MAC PDU, in order to increase the usage of the resources and reduce the delay of MAC CE transmission, the unsuitable MAC CEs may be multiplexed to the MAC PDU associated with the UL grant. For another example, if the priority of an MAC CE is higher than a threshold, the MAC CE may be multiplexed to the MAC PDU associated with the unsuitable UL grant. That is to say, the MAC CE is urgent, it needs to be transmitted as soon as possible, therefore, no matter whether the uplink grant is a suitable one or an unsuitable one, the MAC CE is multiplexed anyway.

For still another example, if a MAC CE belongs to a specific group, it might be multiplexed to the MAC PDU associated with the unsuitable UL grant. Take the second MAC CE group as an example; the MAC CEs in the second group requires low latency, which means they might be urgent. Thus, the MAC CEs in the second group may be multiplexed to the MAC PDU associated with the unsuitable UL grant.

For yet another example, if a specific MAC CE that is specified, configured, or indicated by the network, it might be multiplexed to the MAC PDU associated with the unsuitable UL grant.

The above solutions relate to how to multiplex MAC CEs to the MAC PDU associated with the suitable or unsuitable UL grant. According to above solutions, there might be a case that the MAC CE cannot be multiplexed the MAC PDU associated with the current UL grant because of LCP restriction e.g. non-aligned retransmission scheme. Under this condition, the MAC CE may trigger a scheduling request (SR), and transmitting the SR for requesting more resource to transmit the MAC CEs.

In one embodiment, if the current UL grant is an unsuitable one for a MAC CE, the MAC CE may trigger SR. In the first case, if the associated LCH priority is higher than a threshold, the MAC CE can trigger SR if it is not multiplexed to a suitable MAC PDU and there has no suitable UL grant for the MAC CE. In the second case, if the MAC CE belongs to a specific group, MAC CE can trigger SR if not multiplexed to suitable MAC PDU and there has no suitable UL grant for MAC CE. For example, if the MAC CE belongs to the second group indicated above, which requires low latency, thus, the MAC CE may trigger SR. In the third case, if the MAC CE is a specific MAC CE, which is either specified or configured by network, MAC CE can trigger SR if it is not multiplexed to suitable MAC PDU and there has no suitable UL grant for MAC CE. In the fourth case, if MAC CE is disabled feedback, which may mean the MAC CE requires low latency and needs to be transmitted as soon as possible, the MAC CE can trigger SR if it is not multiplexed to suitable MAC PDU and there has no suitable UL grant for MAC CE.

After triggering the SR, the SR may be cancelled when a certain condition is met. In one embodiment, the SR may be cancelled when the MAC CE has been multiplexed to the MAC PDU associated with a suitable UL grant. In another embodiment, the SR may be cancelled when the UE receives HARQ acknowledgement (ACK) for the MAC PDU that contains the MAC CE. That is, although the MAC CE was multiplexed to the MAC PDU on the unsuitable UL grant, the BS receives the MAC CE anyway, thus the SR triggered by this MAC CE can be cancelled. In still another embodiment, when the UE receives an explicit indication indicating the UE to cancel the SR, the UE should cancel the SR.

Among the MAC CEs, there is BSR MAC CE, which is a MAC CE from UE to Network carrying the information on how much data is in UE buffer to be sent out. After receiving the BSR MAC CE, the network would allocate an uplink grant if resource is available.

Usually, the Buffer Status Report is cancelled when the BSR MAC CE is multiplexed to the MAC PDU associated with the UL grant. However, as indicated above, the BSR MAC CE might be multiplexed to the MAC PDU associated with an unsuitable UL grant, which means it is possible that the BSR MAC CE is not successfully received at the BS's side, or received late at the BS's side.

Therefore, the present disclosure proposes that the BSR may not be cancelled if the BSR MAC CE is multiplexed to the MAC PDU associated with an unsuitable UL grant, in other words, the BSR is still maintained when the BSR MAC CE is multiplexed to the MAC PDU associated with an unsuitable UL grant.

The BSR may be cancelled when a certain condition is met. In one embodiment, the BSR may be cancelled when the MAC CE has been multiplexed to the MAC PDU associated with a suitable UL grant. In another embodiment, the SR may be cancelled when the UE receives a HARQ ACK for the MAC PDU that contains the BSR MAC CE. That is, although the MAC CE was multiplexed to the MAC PDU on the unsuitable UL grant, the BS receives the MAC CE anyway, thus the BSR can be cancelled. In still another embodiment, when the UE receives an explicit indication indicating the UE to cancel the BSR, the UE should cancel the BSR. There might be multiple BSR maintained at the same time, the BS may further indicator the identity of the BSR which should be cancelled, alternatively, the BS may indicate the UE to cancel them all, which are all the BSRs triggered before the correctly received MAC PDU which retransmission scheme is not aligned with BSR MAC CE that contained in it.

Figure 2:
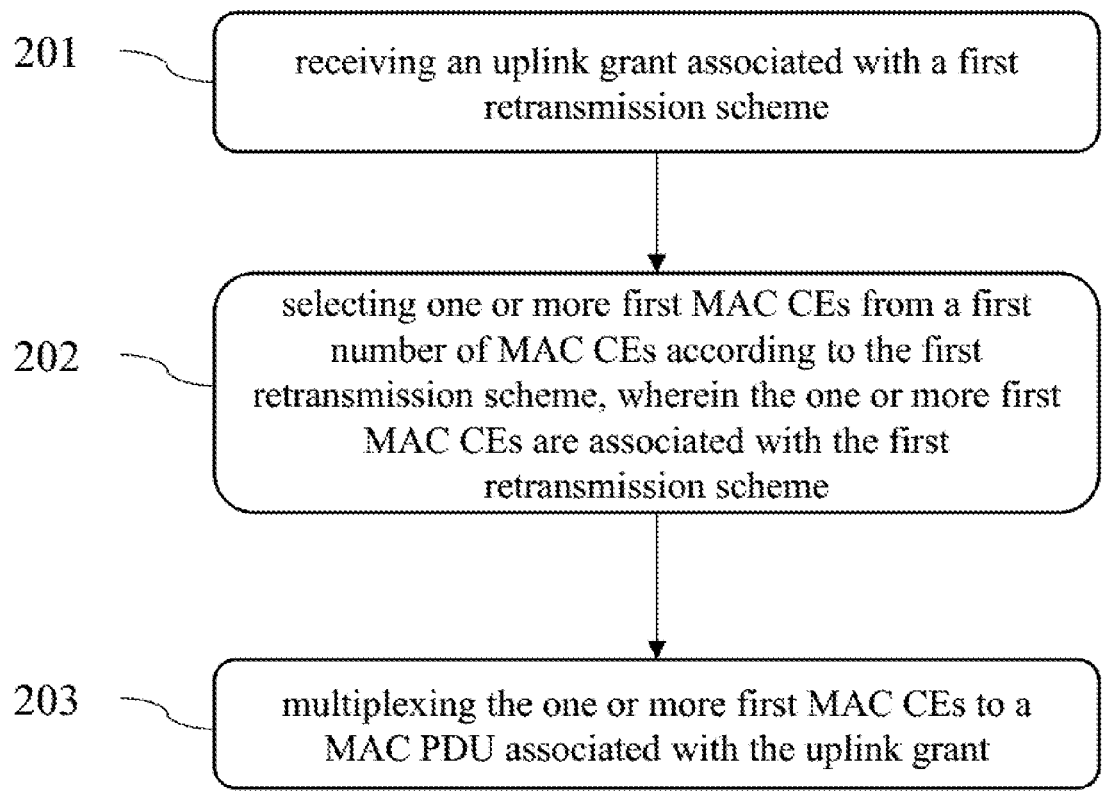
FIG. 2 illustrates a method performed by a UE for wireless communication according to some embodiment of the present disclosure.

FIG. 2 illustrates a method performed by a UE for wireless communication according to some embodiments of the subject disclosure. In step 201, the UE receives an uplink grant associated with a first retransmission scheme; in step 202, the UE selects one or more first MAC CEs from a first number of MAC CEs according to the first retransmission scheme, wherein the one or more first MAC CEs are associated with the first retransmission scheme; and in step 203, the UE multiplexes the one or more first MAC CEs to a MAC PDU associated with the an uplink grant. For example, the UE receives an uplink grant associated with a feedback-based uplink retransmission scheme, thus the UE selects one or more MAC CEs which uses the feedback-based uplink retransmission scheme, and multiplexes these MAC CEs to the MAC PDU associated with the uplink grant.

In the method of FIG. 2, the MAC CEs may not be divided into groups, and the UE directly selects the MAC CEs. To facilitate the selection, the UE may divide the first number of MAC CEs into a second number of groups based on a retransmission scheme of each of the first number of MAC CEs, and then UE selects the one or more first MAC CEs based on the second number of groups of MAC CEs.

The retransmission scheme in the present disclosure may include: a feedback-based uplink retransmission scheme, a non-feedback-based uplink retransmission scheme, a blind uplink retransmission scheme, a bundling uplink retransmission scheme, or other retransmission schemes, etc.

In one embodiment, the UE may multiplex a second MAC CE associated with a second retransmission scheme to the MAC PDU associated with the unsuitable uplink grant, when the uplink grant has padding bits to accommodate additional MAC CEs. In this way, the data transmission efficiency is improved compared with not multiplexing the second MAC CE. Alternatively, when the priority level of the second MAC CE is higher than a threshold, it might mean the second MAC CE is urgent or important, thus it may be multiplexed to the MAC PDU associated with the unsuitable uplink grant, so as to be transmitted sooner than waiting for a suitable UL grant. When the second MAC CE is specified or configured by network, it may also be multiplexed to the MAC PDU associated with the unsuitable uplink grant, so as to be transmitted sooner than waiting for a suitable UL grant.

The UE may transmit a SR when there is no uplink grant associated with first retransmission scheme for a third MAC CE associated with the first retransmission scheme when the associated logical channel priority level associated with the third MAC CE is higher than a threshold. Put it in another way, the third MAC CE might be urgent, but there is no resource for it, so the UE transmits a SR to request more resources for transmitting the third MAC CE. Similarly, the UE may transmit a SR when there is no uplink grant associated with first retransmission scheme for a third MAC CE associated with the first retransmission scheme when the MAC CE belongs to a specific group. For example, the MAC CE belongs to the second group, which is a group with a requirement for low latency, thus the UE transmits SR for resources, so as to transmit the third MAC CE. When a MAC CE requires disabled feedback retransmission scheme, usually means the MAC CE requires low latency, and the UE transmits a scheduling request (SR) when there is no uplink grant associated with first retransmission scheme for a third MAC CE associated with the first retransmission scheme, and the third MAC CE requires disabled feedback retransmission scheme.

The SR may be canceled when the third MAC CE is multiplexed to an MAC PDU associated with a suitable uplink grant. Alternatively, the SR may be canceled when the UE receives an acknowledgement, which indicates that a MAC PDU which includes the third MAC CE has been successfully received. For another embodiment, the SR may be canceled when the UE receives an indication for cancelling the SR.

Regarding BSR MAC CE, when it is multiplexed to an MAC PDU associated with an unsuitable uplink grant, instead of cancelling the BSR, the UE maintains the BSR. When the UE receives an acknowledgement, which indicates that a MAC PDU which includes the BSR MAC CE has been successfully received. For another embodiment, the BSR may be canceled when the UE receives an indication for cancelling the BSR.

Figure 3:
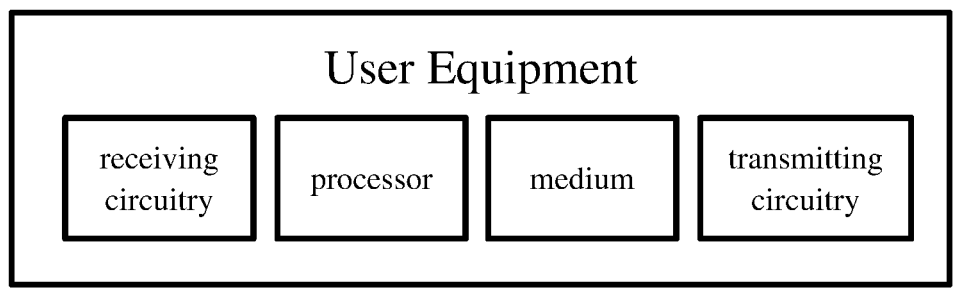
FIG. 3 illustrates a block diagram of a UE according to some embodiments of the present disclosure.

FIG. 3 illustrates a block diagram of a UE according to some embodiments of the present disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 2) with the receiving circuitry, the transmitting circuitry and the processor. That is, upon performing the computer executable instructions, the receiving circuitry may receive an uplink grant associated with a first retransmission scheme, the processor may select one or more first media access control (MAC) control elements (CEs) from a first number of MAC CEs according to the first retransmission scheme, then multiplexing the one or more first MAC CEs to a MACPDU associated with an UL grant.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method, comprising:
   receiving an uplink grant associated with a first retransmission scheme;
   selecting one or more first media access control (MAC) control elements (CEs) from a first number of MAC CEs according to the first retransmission scheme, wherein the one or more first MAC CEs are associated with the first retransmission scheme; and
   multiplexing the one or more first MAC CEs to a MAC protocol data unit (PDU) associated with the uplink grant.

2. The method of claim 1, further comprising:
   dividing the first number of MAC CEs into a second number of groups based on a retransmission scheme of each of the first number of MAC CEs.

3. The method of claim 1, further comprising:
   multiplexing a second MAC CE associated with a second retransmission scheme to the MAC PDU associated with the uplink grant in response to at least one of: the uplink grant has padding bits to accommodate additional MAC CEs; and a priority level of the second MAC CE is higher than a threshold.

4. The method of claim 1, further comprising:
   transmitting a scheduling request (SR) when (i) there is no uplink grant associated with the first retransmission scheme for a third MAC CE associated with the first retransmission scheme, and (ii) a logical channel priority level associated with the third MAC CE is higher than a threshold.

5. The method of claim 1, further comprising:
   transmitting a scheduling request (SR) when (i) there is no uplink grant associated with the first retransmission scheme for a third MAC CE associated with the first retransmission scheme and (ii) the third MAC CE requires disabled feedback retransmission scheme.

6. The method of claim 1, further comprising:
   transmitting a scheduling request (SR) when (i) there is no uplink grant associated with the first retransmission scheme for a third MAC CE associated with the first retransmission scheme; and
   cancelling the SR when the third MAC CE is multiplexed to a MAC PDU associated with a suitable uplink grant, wherein the suitable uplink grant is associated with a retransmission scheme aligned with the first retransmission scheme.

7. The method of claim 1, further comprising:
   transmitting a scheduling request (SR) when (i) there is no uplink grant associated with the first retransmission scheme for a third MAC CE associated with the first retransmission scheme; and
   cancelling the SR after an acknowledgement is received for a MAC protocol data unit (PDU) which includes the third MAC CE.

8. The method of claim 1, further comprising:
   maintaining a buffer status report (BSR) when a BSR MAC CE is multiplexed to a MAC PDU associated with an uplink grant, wherein a second retransmission scheme of the BSR MAC CE is unaligned with the retransmission scheme of the uplink grant; and
   cancelling the BSR after one of (i) an acknowledgement is received for a MAC PDU which includes the BSR MAC CE; and (ii) an indication for cancelling the BSR is received.

9. An apparatus, comprising:
   a non-transitory computer-readable medium having stored thereon computer-executable instructions;
   a receiving circuitry;
   a transmitting circuitry; and
   a processor coupled to the non-transitory computer-readable medium, the receiving circuitry and the transmitting circuitry,
   wherein the computer-executable instructions cause the processor to:
      receive an uplink grant associated with a first retransmission scheme;
      select one or more first media access control (MAC) control elements (CEs) from a first number of MAC CEs according to the first retransmission scheme, wherein the one or more first MAC CEs are associated with the first retransmission scheme; and
      multiplex the one or more first MAC CEs to a MAC protocol data unit (PDU) associated with the uplink grant.

10. The apparatus of claim 9, wherein the computer-executable instructions cause the processor to divide the first number of MAC CEs into a second number of groups based on a retransmission scheme of each of the first number of MAC CEs.

11. The apparatus of claim 9, wherein the computer-executable instructions cause the processor to:
    multiplex a second MAC CE associated with a second retransmission scheme to the MAC PDU associated with the uplink grant when the uplink grant has padding bits to accommodate additional MAC CEs.

12. The apparatus of claim 9, wherein the computer-executable instructions cause the processor to:
    multiplex a second MAC CE associated with a second retransmission scheme to the MAC PDU associated with the uplink grant when a priority level of the second MAC CE is higher than a threshold.

13. The apparatus of claim 9, wherein the computer-executable instructions cause the processor to:
    transmit a scheduling request (SR) when (i) there is no uplink grant associated with the first retransmission scheme for a third MAC CE associated with the first retransmission scheme, and (ii) a logical channel priority level associated with the third MAC CE is higher than a threshold.

14. The apparatus of claim 9, wherein the computer-executable instructions cause the processor to:
    transmit a scheduling request (SR) when (i) there is no uplink grant associated with the first retransmission scheme for a third MAC CE associated with the first retransmission scheme and (ii) the third MAC CE requires disabled feedback retransmission scheme.

15. The apparatus of claim 9, wherein the computer-executable instructions cause the processor to:
    transmit a scheduling request (SR) when there is no uplink grant associated with the first retransmission scheme for a third MAC CE associated with the first retransmission scheme; and
    cancel the SR when the third MAC CE is multiplexed to a MAC PDU associated with a suitable uplink grant, wherein the suitable uplink grant is associated with a retransmission scheme aligned with the first retransmission scheme.

16. The apparatus of claim 1, wherein the computer-executable instructions cause the processor to:
  transmit a scheduling request (SR) when (i) there is no uplink grant associated with the first retransmission scheme for a third MAC CE associated with the first retransmission scheme; and
  cancel the SR after an acknowledgement is received for a MAC protocol data unit (PDU) which includes the third MAC CE.

17. The apparatus of claim 9, wherein the computer-executable instructions cause the processor to:
  maintain a buffer status report (BSR) when a BSR MAC CE is multiplexed to a MAC PDU associated with an uplink grant, wherein a second retransmission scheme of the BSR MAC CE is unaligned with the retransmission scheme of the uplink grant; and
  cancel the BSR after one of (i) an acknowledgement is received for a MAC PDU which includes the BSR MAC CE; and (ii) an indication for cancelling the BSR is received.

18. A base station comprising:
  a receiving circuitry;
  a transmitting circuitry; and
  a processor coupled to the receiving circuitry and the transmitting circuitry, and which causes the base station to:
    transmit, to a user equipment (UE), an uplink grant associated with a first retransmission scheme, the first retransmission scheme enabling the UE to select one or more first media access control (MAC) control elements (CEs) from a first number of MAC CEs according to the first retransmission scheme, wherein the one or more first MAC CEs are associated with the first retransmission scheme.

19. The base station of claim 18, wherein the first retransmission scheme comprises one or more of:
  a feedback-based uplink retransmission scheme;
  a non-feedback-based uplink retransmission scheme;
  a blind uplink retransmission scheme; and
  a bundling uplink retransmission scheme.

20. The base station of claim 19, wherein the processor further causes the base station to:
  receive a scheduling request (SR) from the UE, the scheduling request transmitted by the UE when there is no uplink grant associated with the first retransmission scheme for a third MAC CE associated with the first retransmission scheme; and
  transmit, to the UE, an acknowledgement for a MAC protocol data unit (PDU) which includes the third MAC CE.

* * * * *